United States Patent
Tune

(10) Patent No.: US 12,423,236 B2
(45) Date of Patent: Sep. 23, 2025

(54) COHERENCY CONTROL

(71) Applicant: Arm Limited, Cambridge (GB)

(72) Inventor: Andrew David Tune, Dronfield (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/331,324

(22) Filed: Jun. 8, 2023

(65) Prior Publication Data

US 2024/0004796 A1    Jan. 4, 2024

(30) Foreign Application Priority Data

Jul. 1, 2022 (GB) ...................................... 2209718

(51) Int. Cl.
*G06F 12/0831* (2016.01)
*G06F 12/0871* (2016.01)

(52) U.S. Cl.
CPC ...... *G06F 12/0831* (2013.01); *G06F 12/0871* (2013.01); *G06F 2212/1024* (2013.01)

(58) Field of Classification Search
CPC ............. G06F 12/0831; G06F 12/0871; G06F 12/084; G06F 12/0811; G06F 2212/1024; G06F 2212/1028; G06F 2212/1044; G06F 2212/306; G06F 2212/507; G06F 2212/621; G06F 12/0833
USPC ................................................ 711/118, 117
See application file for complete search history.

(56) References Cited

U.S. PATENT DOCUMENTS

| | | |
|---|---|---|
| 2007/0156972 A1 | 7/2007 | Uehara et al. |
| 2008/0183972 A1* | 7/2008 | Dieffenderfer ...... G06F 12/0831 711/146 |
| 2013/0042078 A1* | 2/2013 | Jalal .................... G06F 12/0815 711/146 |
| 2017/0091092 A1 | 3/2017 | Hur et al. |
| 2017/0255557 A1 | 9/2017 | Robinson et al. |
| 2019/0087333 A1* | 3/2019 | Robinson ............ G06F 13/1668 |
| 2020/0202012 A1 | 6/2020 | Shanbhogue et al. |

FOREIGN PATENT DOCUMENTS

GB      2522057 A      7/2015

OTHER PUBLICATIONS

Combined Search and Examination Report for GB2209718.2, dated Feb. 16, 2023.

(Continued)

*Primary Examiner* — Hosain T Alam
*Assistant Examiner* — Zubair Ahmed
(74) *Attorney, Agent, or Firm* — NIXON & VANDERHYE P.C.

(57) ABSTRACT

An apparatus comprises an non-inclusive cache (14) configured to cache data and coherency control circuitry (16). The coherency control circuitry is configured to look up the non-inclusive cache in response to a coherent access request from a first requestor (4). In response to determining that the coherent access request can be serviced using data stored in a matching entry of the non-inclusive cache, the coherency control circuitry references snoop-filter information associated with the matching entry to determine whether the first requestor can use the data stored in the matching entry without waiting for a response to a snoop of a coherent cache (8).

19 Claims, 10 Drawing Sheets

(56) References Cited

OTHER PUBLICATIONS

Moshovos et al., "Jetty: Filtering Snoops for Reduced Energy Consumption in SPM Servers," Electrical and Computer Engineering University of Toronto, Proceedings of the Seventh International Symposium on High-Performance Computer Architecture, 2001
Menezo et al., "Rainbow: A Composable Coherence Protocol for Multi-Chip Servers," p. 1-12.

\* cited by examiner

COHERENCY CONTROL

The present technique relates to the field of data processing.

A data processing apparatus may comprise requestor devices which issue memory transactions to access data stored at an address in a data store. The memory transactions may be serviced using data, corresponding to the address, stored in a cache at a level of memory system hierarchy between the requestor and the data store. If the memory transaction is coherent, then coherency messages may be issued to snoop other coherent caches in the apparatus which could hold copies of data corresponding to the same address. In some cases, the memory transaction cannot be serviced until a response to a coherency message is received. It would be desirable to reduce the time taken to service a memory transaction. It would also be desirable to reduce the area and power cost of the data processing apparatus.

Viewed from one aspect, the present technique provides an apparatus comprising:
 a non-inclusive cache configured to cache data; and
 coherency control circuitry configured to:
  look up the non-inclusive cache in response to a coherent access request from a first requestor, and
  in response to determining that the coherent access request can be serviced using data stored in a matching entry of the non-inclusive cache, reference snoop-filter information associated with the matching entry to determine whether the first requestor can use the data stored in the matching entry without waiting for a response to a snoop of a coherent cache.

Viewed from another aspect, the present technique provides a method comprising:
 caching data in a non-inclusive cache;
 looking up, with coherency control circuitry, the non-inclusive cache in response to a coherent access request from a first requestor; and
 in response to determining that the coherent access request can be serviced using data stored in a matching entry of the non-inclusive cache, referencing, with the coherency control circuitry, snoop-filter information associated with the matching entry to determine whether the first requestor can use the data stored in the matching entry without waiting for a response to a snoop of a coherent cache.

Viewed from yet another aspect, the present technique provides a computer-readable medium to store computer-readable code for fabrication of an apparatus comprising:
 a non-inclusive cache configured to cache data; and
 coherency control circuitry configured to:
  look up the non-inclusive cache in response to a coherent access request from a first requestor, and
  in response to determining that the coherent access request can be serviced using data stored in a matching entry of the non-inclusive cache, reference snoop-filter information associated with the matching entry to determine whether the first requestor can use the data stored in the matching entry without waiting for a response to a snoop of a coherent cache.

Further aspects, features and advantages of the present technique will be apparent from the following description of examples, which is to be read in conjunction with the accompanying drawings, in which.

Figure 1:
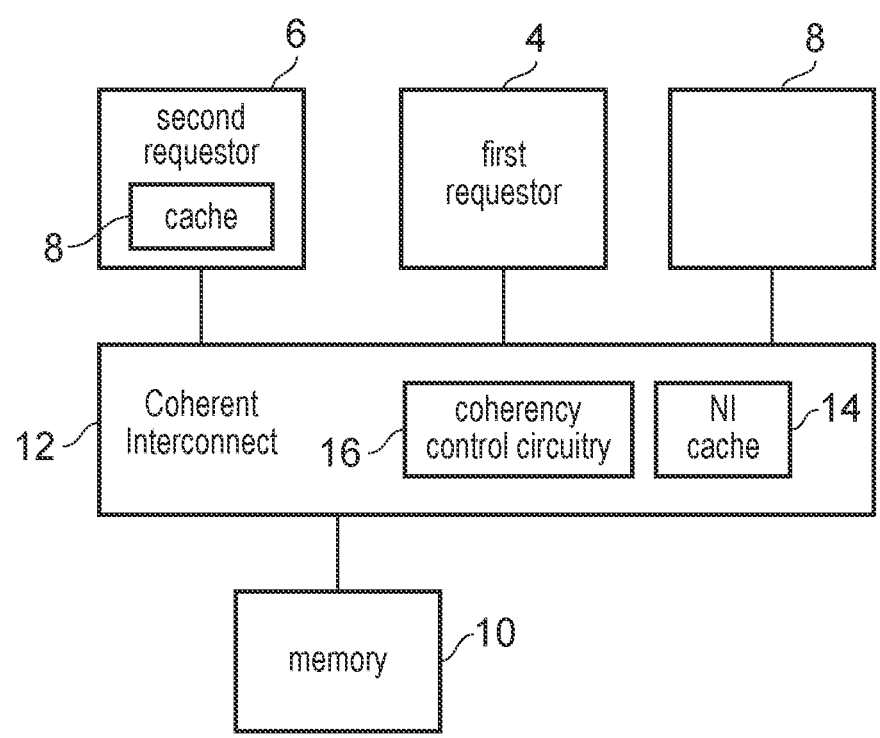
FIG. 1 illustrates a schematic diagram of a processing system.

As discussed above, a data processing apparatus may comprise requestors which issue memory transactions to read or write data to locations of a data store corresponding to addresses specified by the transactions. It will be appreciated that the term "data" is used to cover both processing data that may be an input or output of a processing operation, as well as instructions which are fetched and decoded to control the performance of processing operations. The data store may be a memory and could be either part of the apparatus itself or an external data store which is not part of the apparatus. The apparatus may also comprise a number of caches to hold copies of data corresponding to an address in the data store, to allow memory transactions to be serviced more quickly. An access request hits in a cache when a valid entry in the cache has a tag which corresponds to the address of the access request. The valid entry having the corresponding tag can be referred to as a matching entry or a hit entry. The caches may be at different levels within a cache hierarchy in the apparatus. For example, an access request missing in one level of cache may be passed to a lower level of cache closer to memory, and so on. Some caches may be associated with no requestors, some may be associated with a single requestor, some caches may be shared between a number of requestors, and some caches may be shared between all requestors. As caches may be accessed by different requestors which may modify the data stored in the cache, or the data may be modified through cache stashing (data being pushed to a cache without explicitly being requested by a requestor associated with the cache), copies of data corresponding to the same address may vary between caches. When a requestor issues a coherent access request, it may be requesting the most up-to-date copy of data corresponding to an address. Hence, in response to a coherent access request, snoop requests may be sent to one or more coherent caches which could hold a copy of the data, and manage changes in coherency state at those caches and/or responses to the requestor with more up-to-date versions of the data as necessary.

The apparatus comprises a non-inclusive cache. As discussed above, caches may be within a cache hierarchy. For example, a cache hierarchy may include several caches, with a cache at the lowest position in the hierarchy being closest to main memory, and each cache at a higher position being further from main memory. Access requests missing in a given level of the cache hierarchy may be passed on to the next lower level of cache, closer to the main memory. An inclusive cache contains entries corresponding to the memory addresses cached in each higher level cache. Hence, if an access request misses in an inclusive cache then the access request cannot hit at any cache higher in the hierarchy than the inclusive cache. Using an inclusive cache allocation policy can be helpful to reduce the bandwidth needed for cache traffic between levels of cache, because on eviction of clean data from a higher-level cache there is no need to update a lower level cache because the lower level inclusive cache will already contain the clean data. Also, it can be known that if a lookup misses in a lower-level inclusive cache, then there is no need to snoop the higher-level cache as the required data will not be present in the higher-level cache either. However, the requirement for an inclusive cache to store data corresponding to every cache line cached in a higher level cache can lead to inclusive caches having a large area and having a high power consumption. A non-inclusive cache at a given level of the cache hierarchy may not contain an entry corresponding to a memory address cached in a higher level cache, allowing them to be smaller than an inclusive cache at the same level. A miss in a non-inclusive cache does not provide any information regarding whether the memory access request would hit or miss in a higher level cache. Non-inclusive caches include exclusive caches and non-inclusive non-exclusive caches. In an exclusive cache, a hit in a given level of cache may mean that the next highest level of cache cannot contain a cached copy of the data. In a non-inclusive non-exclusive cache, the cache is non-inclusive because it does not necessarily contain entries corresponding to each entry in a higher level cache, and is non-exclusive because the presence of an entry in one level of cache does not preclude the presence of an entry corresponding to the same address in the next higher level of cache.

When a coherent access request hits in the non-inclusive cache, it is not known whether a copy of data corresponding to the matching entry is also present in a higher level cache. Therefore, coherency control circuitry (or another component of the system, such as the requestor that issued the coherent access request) may be configured to snoop one or more higher level coherent caches than the non-inclusive cache as part of the process of handling the coherent access request. However, the time taken for a snoop response may be longer than the time taken to service the access request using the non-inclusive cache. Therefore, processing may be delayed whilst waiting for a snoop response.

One technique to overcome this problem may be to provide an inclusive snoop filter associated with the non-inclusive cache. The inclusive snoop filter may contain an entry corresponding to every cache line in a higher level cache than the non-inclusive cache. In response to the coherent access request hitting in the non-inclusive cache, a lookup could be performed in the inclusive snoop filter. A miss in the inclusive snoop filter indicates that a particular cache line is not cached at a higher level cache, and therefore that there is no need to wait for a snoop response before servicing the access request. However, this technique is associated with a large amount of overhead. Storing an entry for every cache line cached in a higher level of cache means than many entries may need to be stored, which is associated with a large power and area cost.

In the examples discussed below, snoop-filter information is associated with respective entries of the non-inclusive cache. Coherency control circuitry is configured to look up the non-inclusive cache in response to a coherent access request from a first requestor, and in response to determining that the coherent access request can be serviced using data stored in a matching entry of the non-inclusive cache, reference snoop-filter information associated with the matching entry to determine whether the first requestor can use the data stored in the matching entry without waiting for a response to a snoop of a coherent cache. Each item of snoop-filter information may correspond with an associated entry of the non-inclusive cache, and the coherency control circuitry may reference the snoop-filter information by determining the state of the item of snoop-filter information corresponding to the matching entry. The snoop-filter information is referenced on a hit in the non-inclusive cache. There is no need to reference snoop-filter information on a miss in the non-inclusive cache.

Providing snoop-filter information associated with entries of the non-inclusive cache means that the latency of certain coherent access requests can be reduced. In particular, there may be a reduced latency for coherent access requests which hit against an entry of the non-inclusive cache, for which the snoop-filter information indicates that the first requestor can use the data stored in the matching entry without waiting for a snoop response. This is because the coherent access request can be serviced using the data stored in the non-inclusive cache without waiting for snoop responses. Whilst without the snoop-filter information the first requestor or the coherency control circuitry would be expected to wait for snoop responses before using the data (because it does not know whether any higher level coherent caches contain a more up-to-date copy of the requested data), with the snoop-filter information it can be indicated when it is not required to wait for a snoop response (for example when no higher level cache holds a copy of the data). Hence, the delay associated with waiting for snoop responses (which are expected to be returned after the access request could be serviced using data stored in the non-inclusive cache) can be avoided for certain access requests and hence the latency of those access requests is reduced. This delay can be significant in certain cases, such as when the snooped caches (or the caches that would be snooped if not for the snoop-filter information) are in a low power state, and hence the reduction in latency can be significant. Nevertheless, as the snoop-filter information is associated with cache entries in the non-inclusive cache, it can be implemented relatively efficiently compared to an inclusive snoop-filter or an exclusive snoop-filter which is independent of the non-inclusive cache.

The coherent cache for which the snoop is sent may be a cache associated with a second requestor which can modify the data stored in the coherent cache. The second requestor could include a processor, a processing cluster (either homogeneous or heterogeneous), a hardware accelerator, and so on. Alternatively, the coherent cache may not be associated with any particular requestor, but could contain dirty data if a component requests that updated data is stashed in the cache, so could still be subject to snooping.

In some examples, the coherency control circuitry is configured to track snoop-filter information only for addresses allocated a valid entry in the non-inclusive cache. Hence, the coherency control circuitry is unable to access snoop-filter information corresponding to a coherent access request that misses in the non-inclusive cache. It might appear to be counter-intuitive to provide snoop-filter information only for those addresses that are cached in the non-inclusive cache, because one would think this means that only a relatively low fraction of snoops (those corresponding to access requests for addresses cached in the non-inclusive cache, which may be a small proportion of the total access requests) can be filtered out by the snoop-filter information. Hence, it could be assumed that the small reduction in snoops does not justify the overhead of the snoop-filter information. However, when a coherent access request misses in the non-inclusive cache, the time taken to service the request is increased due to the time taken to retrieve the data from a further level of cache or memory. Hence, when the coherent access request misses in the non-inclusive cache, the time taken to service the request is less likely to depend on waiting for a snoop response.

Therefore, the performance improvement of not waiting for a snoop response (provided by the snoop-filter information) is more likely to be seen when the coherent access request hits in the non-inclusive cache. Hence, a reduction in overhead can be achieved by providing the snoop-filter information only for those entries which hit in the non-inclusive cache. This reduces the overhead of providing snoop-filter information whilst having a reduced impact on performance as the addresses allocated valid entries in the non-inclusive cache are the addresses most likely to benefit from the snoop-filter information. In addition, whilst one might think that only a relatively low fraction of snoops could be filtered out by the snoop-filter information, if the system-level cache is large, its hit rate may be quite large in some use cases, and therefore the benefit of providing the snoop-filter information can be significant.

An alternative technique may be to provide an exclusive snoop filter which may keep a record of recently snooped addresses that returned negative responses for a coherent cache, and based on this record filter snoop requests from reaching the coherent cache. The exclusive snoop filter would be independent of any lower-level cache and so can track snoop filter information for any addresses and is looked up independent of any other lookup of a lower-level cache than the coherent cache being tracked using the snoop filter information. This alternative is associated with more overhead than is required when snoop-filter information is only stored for entries in the non-exclusive cache, and does not exploit the realisation that the case where performance can be improved most (by filtering snoops or allowing data to be used without waiting for a snoop response) is when there is a hit in the non-exclusive cache so that an access to memory is not required.

When performing a lookup in the non-inclusive cache, a tag value associated with a given entry may be used to determine whether a given access request hits against the given entry. In some examples, the snoop-filter information and the data associated with the given entry share a tag value. Hence, the same tag value is used to look up the cache for data corresponding to a given entry and to identify which snoop-filter information corresponds to the given entry. In some examples, the tag value and data corresponding to an entry are stored in the same cache entry of a shared tag/data cache array, and the snoop-filter information corresponding to the entry is also stored in the same cache entry. In other examples, tag values are stored within a tag array in the cache and the data is stored in a separate data array, and the snoop-filter information associated with a given cache entry can be stored in either the tag array entry corresponding to the given cache entry or be stored in the given cache entry itself. Hence, there are a wide variety of ways in which the physical storage for the tag value, data and snoop-filter information can be implemented. However, regardless of which physical arrangement is used, sharing a tag value between snoop-filter information and the data of an entry means that there is no need to perform a separate lookup to find snoop-filter information corresponding to a matching entry of the non-inclusive cache. Once a matching entry has been identified based on a tag lookup, the snoop-filter information can be read out (e.g. from the hit cache entry itself or from a snoop-filter or tag entry with a corresponding entry index to the hit cache entry) without incurring a further delay of a further tag lookup to locate the snoop-filter information. In addition, the storage requirements of the snoop-filter information are reduced as there is no need to store an extra tag value for the snoop-filter information.

The encoding format of the snoop-filter information is not particularly limited, as long as it can indicate whether the first requestor can use the data stored in the matching entry without waiting for a response to a snoop of a coherent cache. For example, the snoop-filter information could comprise a coherency state indication such as an indication of the coherency state of the requested address in a higher-level coherent cache. However, in another example the snoop-filter information associated with a given entry of the non-inclusive cache is stored as a snoop-filter flag indicating whether or not the first requestor can use the data stored in the matching entry without waiting for the response to the snoop of a coherent cache. Whilst this flag could be encoded using more than one bit, a single bit could be sufficient to provide this flag. Hence, the snoop-filter information could be provided using a small amount of storage per entry of the non-inclusive cache, and hence the technique could be implemented with very low cost.

In some examples, snoop requests could be issued by the coherency control circuitry associated with the non-inclusive cache. In these examples, the snoop-filter information could be used to determine whether to snoop the coherent cache in response to the request from the first requestor. If the snoop-filter information indicates that the first requestor can use the data stored in the matching entry without waiting for a response to a snoop of a coherent cache, then there may be no need to issue the snoop in the first place. Hence, the snoop-filter information could be used to determine that there is no need to issue a snoop request. In addition to avoiding the need to wait for a snoop response, this also reduces the power cost of sending, receiving, and performing snoop requests, and reduces the amount of unnecessary snoop traffic in the system (improving performance and power efficiency at the coherent cache by avoiding unnecessary snoop lookups which use up cache lookup bandwidth and could delay servicing of other requests).

In some examples where the snoop requests are issued by the coherency control circuitry associated with the non-inclusive cache, in response to determining that the coherent access request misses in the non-inclusive cache, the coherency control circuitry may be configured to issue a speculative memory access request to the data store before receiving a response to the snoop request. When the access request misses in the non-inclusive cache, it is not known whether higher level coherent caches hold a copy of the data or not, because the non-inclusive cache is not inclusive. Hence, a snoop request to higher levels of coherent cache may be issued to determine whether any higher level caches hold a more up-to-date copy of the data. If the data is not held in any of the higher level caches, then a copy of the data may be retrieved from memory instead to service the access request. Due to the delay associated with memory accesses, performance may be improved by speculatively issuing a memory access request speculating that no higher level cache holds a copy of the data. If a higher level cache does hold a copy of the data (if the speculation was incorrect) then the memory access request may have been unnecessary, but if no higher level cache holds a copy of the data then speculatively issued memory access request may return a copy of the data earlier than if the memory access request were issued after the snoop response had been received. Hence, speculatively issuing a memory access request to the data store before receiving a snoop response can improve performance upon a miss in the non-inclusive cache.

In some examples, when the coherent access request misses in the non-inclusive cache, the coherency control circuitry is configured to delay responding to the coherent access request until receipt of a snoop response. When the coherent access request misses in the non-inclusive cache, there may be no available snoop-filter information corresponding to that coherent access request. Hence, it may not be known whether or not there are any copies of the requested data in a higher level cache, and therefore no data should be used until those higher level caches have been snooped. In some cases, data may be returned from the data store before the snoop responses are received (for example, if there is a further layer of cache below the non-inclusive cache, and/or if the snooped processors are in a low power state making them slower to response to snoop requests). In these cases (in addition to when there is a hit in the non-inclusive cache but the snoop-filter information indicated that a snoop response was needed), the coherency control circuitry may delay responding to the coherent access request until the snoops have been returned so that out-of-date data is not returned to the first requestor. Alternatively, the coherency control circuitry may discard the data returned from the data store (which may be considered to be speculative data as it has been requested from the data store speculatively before receiving snoop responses) and try again later by requesting the data again from the data store once the snoop responses have been received (for example, the coherency control circuitry may discard the data if it runs out of storage space for the speculative data).

As discussed above, in some examples snoop requests could be issued by the coherency control circuitry associated with the non-inclusive cache. However, in other examples snoop requests could be issued by the first requestor itself. For example, the first requestor may issue both snoop requests to caches in the system and a coherent access request to the non-inclusive cache. If snoop-filter information were not provided, the first requestor may wait until all snoop responses were received before using data returned in response to the access request, even if data is returned from the non-inclusive cache before the snoop responses are received at the first requestor. However, in some examples the coherency control circuitry may be configured to return an indication to the first requestor indicating whether the first requestor can use the data stored in the matching entry without waiting for a snoop response from a coherent cache. Hence, the snoop-filter information is used to determine whether the first requestor can use the data stored in the matching entry without waiting for a response to a snoop of a coherent cache, and the coherency control circuitry returns this information to the first requestor in an indication. Then, even if the first requestor has issued snoop requests and has not yet received snoop responses, when data is returned from the non-inclusive cache with an indication that the first requestor can use the data stored in the matching entry without waiting for a response to a snoop of a coherent cache, performance is improved as the first requestor does not need to wait for a snoop response. Hence, providing snoop-filter information associated with the non-inclusive cache can reduce the time taken to service a coherent access request from a first requestor, regardless of whether snoop requests are issued by the first requestor or by the coherency control circuitry associated with the non-inclusive cache.

The system may have two or more coherent caches. In some examples, snoop-filter information may be used to determine whether the first requestor can use the data stored in the matching entry without waiting for any snoop response. In these cases, if the snoop-filter information indicates that the first requestor can use the data stored in the matching entry without waiting for a response to a snoop of a coherent cache then the data can be used without waiting for any snoop response. However, if the snoop-filter information indicates that a snoop response is needed then the apparatus may require that a snoop response is received from each coherent cache that was snooped in response to the coherent access request before the first requestor can use the data stored in the matching entry.

However, in other examples having two or more coherent caches, the coherency control circuitry may be configured to reference the snoop-filter information associated with the matching entry to separately determine whether the first requestor can use the data stored in the matching entry without waiting for a response to a snoop of each of two or more coherent caches. Hence, the snoop-filter information indicates separately for each of two or more coherent caches whether the first requestor can use the data stored in the matching entry without waiting for a snoop response from that particular coherent cache. Then, the first requestor may use the data stored in the matching entry when snoop responses have been received from those coherent caches for which a snoop response is indicated as required by the snoop-filter information, regardless of whether a snoop response has been received from the other coherent caches for which the first requestor can proceed without waiting for a snoop response. In some cases snoop requests are not issued to those other coherent caches from which a snoop response is not needed, reducing the amount of snoop requests issued. Alternatively, snoop requests may already have been issued to those other coherent caches, but the first requestor or the coherency control circuitry can simply ignore the responses once received, if the snoop-filter information indicated that waiting for the responses was not necessary.

In examples separately providing snoop-filter information for two or more coherent caches, the encoding of the snoop-filter information is not particularly limited. Coherent caches may be grouped, such that snoop-filter information is provided for each group of coherent caches. For example, snoop-filter information could comprise separate cache coherency information provided for each coherent cache or group of coherent caches. However, in another example the snoop-filter information comprises a vector of flags, each flag corresponding to a respective cache group, each cache group comprising one or more coherent caches, and each flag indicating whether the first requestor can use the data stored in the matching entry without waiting for the response to the snoop of the corresponding cache group.

In some examples in which the first requestor receives snoop responses (such as examples in which the first requestor issued snoop requests), in response to determining that the coherent access request misses in the non-inclusive cache, the coherency control circuitry is configured to return a miss indication to the first requestor indicating that the first requestor should wait for a snoop response from the coherent cache. Because the non-inclusive cache is non-inclusive, a miss does not indicate that a higher level cache does not hold a cached copy of data corresponding to the requested address. Hence, upon a cache miss the first requestor may not use requested data until each snoop response has been received.

The present technique provides a performance improvement by allowing time to be saved in the case that the non-inclusive cache holds a copy of the requested data and snoops are not needed to higher level caches. The performance improvement is more likely to arise in caches having a read-no-allocate and write-allocate allocation policy because it is more likely that data allocated in these caches is dirty data being written back from a higher level cache (so a copy is not present in the higher level caches, and hence a snoop is not needed), so the probability of a matching entry in the non-inclusive cache being associated with snoop filter information indicating that the snoop is not needed is higher with a read-no-allocate and write-allocate policy than with other policies. In some examples, the read-no-allocate and write-allocate allocation policy applies only to those requests initiated from a given subset of requestors (including the coherent cache itself or an associated requestor). In other examples, the read-no-allocate and write-allocate allocation policy applies to every request (including requests from other requestors other than a requestor associated with the coherent cache). Hence, while the technique may be implemented with any non-inclusive cache, a particularly useful implementation may be found when the technique is used in non-inclusive caches having a read-no-allocate and write-allocate allocation policy at least for requests based on accesses to the coherent cache.

In some examples, the coherency control circuitry is configured to set the snoop-filter information. In some examples, in response to detecting an indication that the coherent cache does not hold a copy of data corresponding to a given entry, the coherency control circuitry is configured to set the snoop-filter information corresponding to the given entry to indicate that the first requestor can use the data stored in the given entry without waiting for the response to the snoop of the coherent cache. If there are two or more coherent caches, then the coherency control circuitry may set the snoop-filter information corresponding to a particular coherent cache or group of caches in response to detecting the indication. The coherency control circuitry may monitor coherency transactions relating to the coherent cache. When a transaction is monitored that indicates that the coherent cache no longer holds a copy of data corresponding to a given entry in the non-inclusive cache, then it can be inferred that there is no need to wait for a snoop response from that coherent cache as the snoop response would merely indicate that the coherent cache does not hold a valid copy of the data. These transactions may include transactions issued by a second requestor corresponding to the coherent cache, the transactions indicating that a cache line has been evicted from the coherent cache associated with the second requestor.

In some examples, the apparatus comprises the non-inclusive cache and the coherency control circuitry, but does not include at least one of the first requestor, the snooped coherent cache, and/or the data store. For example, the apparatus may be provided as a coherent interconnect that receives requests from and sends messages to requestors, caches, and data stores but does not itself include these other components. However, in other examples the apparatus includes the first requestor and the coherent cache. In some cases, the apparatus may also include a second requestor associated with the coherent cache and/or the data store.

The coherent cache is not particularly limited. In some examples, the coherent cache is associated with a second requestor, to cache data in response to read or write requests issued by the second requestor. The second requestor is not particularly limited and may include a processor or hardware accelerator, for example. In some examples, the second requestor is a processing cluster comprising two or more processors, which may be homogeneous or heterogeneous. The processing cluster may comprise a shared cache in addition to private caches associated with each of the processors. Hence, the second requestor may comprise several caches, each of which may be a snooped coherent cache. Providing an inclusive snoop filter associated with the non-inclusive cache becomes more expensive as the number of entries in higher level caches increases. Hence, in an example where the second requestor comprises several caches, it is more likely that there would be too many cache lines in higher level caches to justify the provision of an inclusive snoop filter associated with the non-inclusive cache. In these examples, providing snoop-filter information associated with entries of the non-inclusive cache has a reduced overhead compared to providing an inclusive snoop filter. Therefore, a particularly useful implementation of the present technique is found when the coherent cache is associated with a second requestor comprising a cluster of two or more processors.

In some examples when the second requestor is a processing cluster, the cluster may comprise a cluster snoop filter. For example, the cluster may comprise a shared cluster cache and the cluster snoop filter may be associated with the shared cluster cache. The cluster snoop filter may filter snoop requests sent between processors in the cluster to snoop the private caches associated with each processor. In this way, the cluster snoop filter can be considered to operate at a separate coherency level to the non-inclusive cache. The non-inclusive cache could be considered an addition to the existing coherency model provided within the processing cluster, making it less desirable to provide a fully inclusive snoop filter at the level of the non-inclusive cache. The cluster snoop filter may be an inclusive snoop filter, comprising an entry corresponding to each cache line in the processing cluster. This makes it less desirable to provide an inclusive snoop filter at the level of the non-inclusive cache, given that the cost of an inclusive snoop filter has already been incurred in the processing cluster and the cost of an inclusive snoop filter at the level of the non-inclusive cache may be even higher as it may not only duplicate the inclusive snoop filter at the processing cluster but may also have entries corresponding to other higher-level caches outside the processing cluster.

The first requestor is not particularly limited. In some examples, the first requestor may comprise a processing cluster. Similar considerations apply as above, making it undesirable to provide an inclusive snoop filter at the level of the non-inclusive cache. In other examples, the first requestor may comprise an I/O coherent device. An I/O coherent device may ensure that it maintains coherency with cache lines stored in the rest of the system, but the rest of the system may not need to ensure coherency with the I/O coherent device, as the I/O coherent device may not have any cache itself. That is, the I/O coherent device may issue coherent requests (possibly including snoop requests) but may not itself be snooped. This may make it less desirable to provide an inclusive snoop filter at the non-inclusive cache, because it may essentially only cover the same cache lines as a snoop filter provided at a higher level of cache (such as a cluster snoop filter when the second requestor is a processing cluster).

Hence, in a system where a coherent request from an I/O coherent device causes a lookup of a non-inclusive cache at a lower level of the cache hierarchy than caches in a processing cluster which itself includes an inclusive-snoop filter, one would think there would be little benefit to providing additional snoop filtering capability at the level of the non-inclusive cache. However, it is recognised that there can be a performance penalty in requiring the first requestor to await receipt of snoop responses from the processing cluster before proceeding to use data available from a matching entry of the non-inclusive cache, so providing a limited amount of snoop filter information associated with those entries cached in the non-inclusive cache (while not attempting to provide snoop-filter information for addresses not cached in the non-inclusive cache) allows the cases on a cache hit when performance would be most greatly impacted by waiting for the snoop to have performance improved when the snoop filter information indicates there is no need to wait for the snoop response.

The present technique will now be described further with reference to the accompanying figures.

FIG. 1 illustrates a schematic diagram of a processing system. The processing system comprises a first requestor 4, a second requestor 6, coherent caches 8, a memory 10, and a coherent interconnect 12 comprising a non-inclusive system-level cache (SLC) 14 and coherency control circuitry 16. The first requestor 4 is configured to issue a coherent access request to the coherent interconnect 12 to request the most up-to-date copy of data corresponding to an address in the memory 10. The most up-to-date copy of the data could be stored in any of the coherent caches 8, the system-level cache 14, or in memory 10. Therefore, the processing system supports coherency transactions to control coherency between versions of the data in different caches 8. For example, the system may support coherency transactions conforming to a protocol such as the Arm® AMBA® protocol. When a coherent access request is received at the coherent interconnect 12, the coherency control circuitry 16 may issue snoop requests to caches 8 which may hold a copy of the requested cache line (such as the one or more caches 8 associated with the second requestor 6). The snoop requests may determine whether a more up-to-date copy of the cache line is held in the snooped cache, and if so return a copy of the more up-to-date data in a snoop response. The snoops may also modify coherency state at the snooped caches 8 (e.g. invalidate an entry of the snooped cache 8 if the first requestor is requesting to write to the data). Alternatively, the snoops may be issued directly from the first requestor 4 to the caches 8 which may hold a copy of the requested cache line, bypassing the coherent interconnect 12. The system-level cache 14 is non-inclusive, meaning that cache lines stored in higher level caches 8 are not necessarily also stored in the system-level cache 14. This means that a miss in the SLC 14 does not indicate that the higher level caches 8 do not hold a (potentially modified) copy of the cache line. The SLC 14 may also be non-exclusive, meaning that a hit in the SLC 14 does not indicate that higher level caches 8 do not hold a copy of the cache line. Hence, regardless of a hit or miss in the SLC 14, higher level caches 8 may hold a copy of the cache line, and therefore snoops may be needed to higher level caches 8. The first requestor 4 may issue non-coherent access requests, in response to which data may be returned without following the usual cache coherency protocol.

Figure 2A:
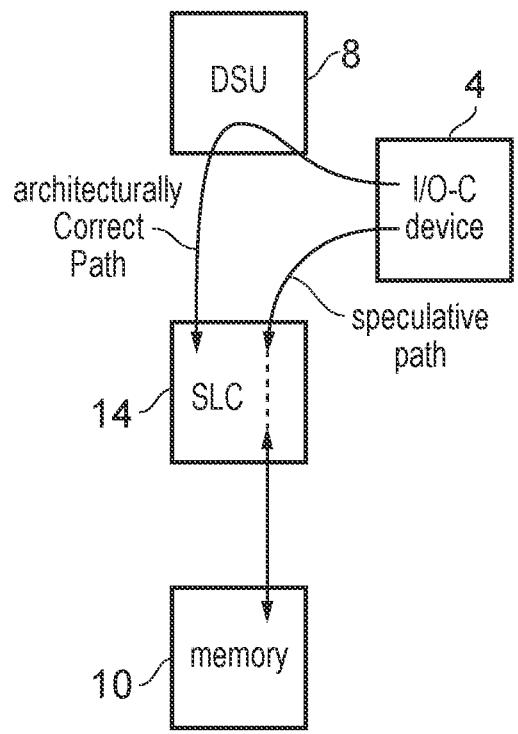
FIGS. 2A and 2B show examples of a coherent access request issued by a first requestor.
Figure 2B:
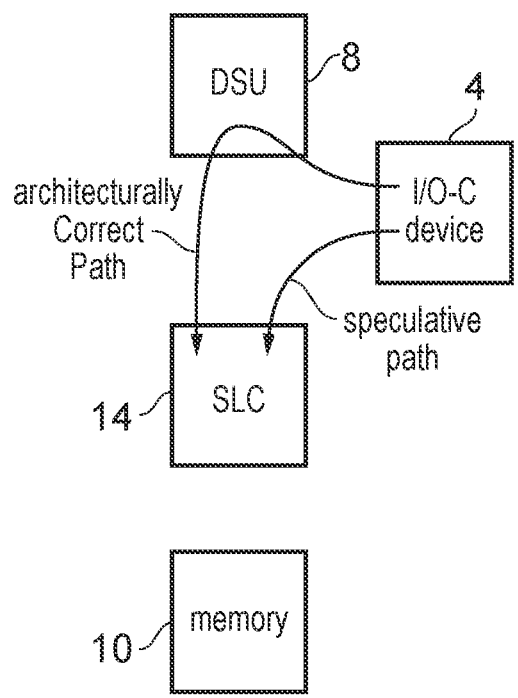

FIGS. 2A and 2B show examples of a coherent access request issued by the first requestor 4. In the example of FIGS. 2A and 2B the first requestor 4 is an I/O coherent device, although this is merely an example. When a coherent access request cannot be serviced in response to the snoop requests (there is not another copy of the cache line in the snooped caches 8), a memory request may be issued, in response to which a lookup may be performed in the system level cache 14 and, if that lookup misses, in the memory 10. It may be preferable to send snoop requests to one or more caches 8 and the request to the main memory 10 in parallel. This is because a large proportion of the snoop requests may miss in the snooped caches 8, and therefore the memory request may be required anyway, so issuing the memory request earlier may reduce latency on a coherent access request. FIG. 2A illustrates an example of a processing system in which two requests are issued in parallel. The architecturally correct path involves snooping the caches 8 first before performing a lookup in the system level cache (the caches may be associated with an Arm® DynamIQ™ Shared Unit (DSU), as in FIG. 7). It is called the architecturally correct path because if any of the snooped caches 8 contains an up-to-date copy of the data, then architecturally correct results would be achieved by using the up-to-date data. Not performing this lookup could result in old data being used in a processing operation which could lead to architecturally incorrect results. The snoop requests may be issued by the coherent interconnect 12 or by the first requestor 4 itself. The speculative path involves looking up the system-level cache 14 without snooping the caches 8, and if the lookup misses then performing a memory access to retrieve data corresponding to the access request. The snoops to the coherent cache 8 on the architecturally correct path may be issued directly by the first requestor 4, or may be issued by a coherent interconnect in response to a coherent access request issued by the first requestor 4.

In the example of FIG. 2A, the SLC 14 lookup on the speculative path misses, and therefore a memory access is performed. A memory access is typically slow, and therefore it may be expected that by the time data has been returned in response to the memory access request, the architecturally correct path has completed the snoops of the caches 8 in the system. It can be determined whether the coherent access request should be serviced using the data retrieved from memory 10 or with data stored in a cache based on the snoop responses.

In the example of FIG. 2B, the SLC 14 lookup on the speculative path hits in the SLC 14. Therefore, the SLC 14 contains data which could be used to service the coherent access request. However, the access request cannot be serviced until the architecturally correct path has completed and the snoop responses have been received. The time taken for snoop responses to be received from the coherent cache 8 may be longer than the time taken to hit on an entry in the SLC 14. In certain cases the snoop responses may be particularly delayed. For example, the coherent cache 8 could be in a power saving state in which snoop requests cannot be responded to, and therefore time is taken for the cache to wake up before snoop responses can be returned. Hence, in the case illustrated in FIG. 2B, a delay is incurred between when the coherent access request could potentially be serviced and when it actually is serviced, due to the time taken waiting for snoop responses. Performance could be improved by reducing this delay.

The inventor has recognised the potential for improved performance, and has proposed providing snoop-filter information associated with the system-level cache 14 which can be referenced to determine whether the first requestor 4 can use the data stored in the matching entry without waiting for a response to a snoop of a coherent cache. The snoop-filter information may be used in several ways, each associated with improved performance.

Figure 3A:
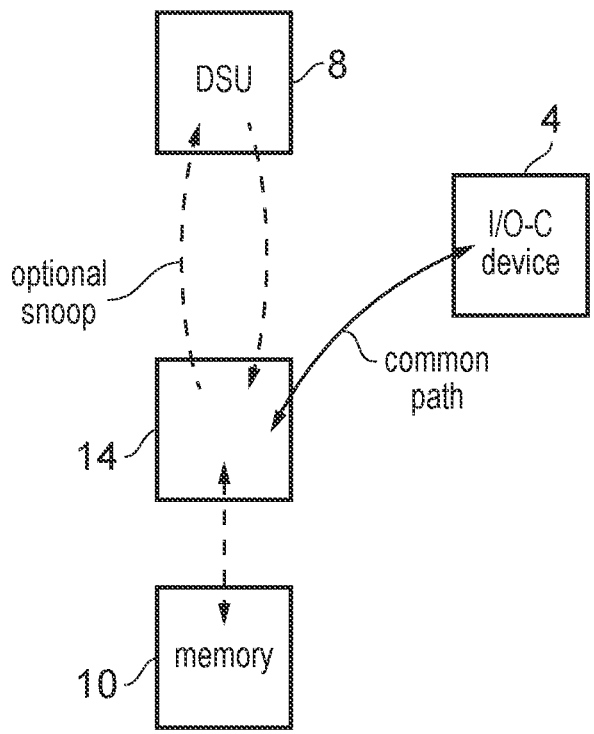
FIGS. 3A and 3B show examples of the use of snoop-filter information in response to a coherent access request.

FIG. 3A provides an example use of the snoop-filter information. Rather than issuing two parallel requests, one coherent access request is issued to the coherent interconnect 12 (along a common path). The SLC 14 is looked up in response to the coherent access request. If the lookup misses, snoop requests are issued to the coherent cache(s) 8 and a parallel memory access request is issued to memory 10. This situation is equivalent to that shown in FIG. 2A. However, if the SLC 14 lookup hits, the snoop-filter information associated with the SLC 14 is referenced. The snoop-filter information may indicate that the first requestor 4 should wait until the snoop responses are received before using the data in the matching entry. This may be the case if it is unknown whether a higher level cache holds a copy of the requested data. However, in some cases it is known that a higher level cache does not hold a coherent copy of the requested data, this can be indicated by the snoop-filter information, and in these cases there is no need to wait for snoop responses before the first requestor 4 uses the data stored in the matching entry of the SLC 14. In some cases, the snoop requests are not issued if it is known that they will miss in the higher level caches 8 based on the snoop-filter information. Hence, the coherent access request may be serviced without waiting for a snoop response.

Figure 3B:
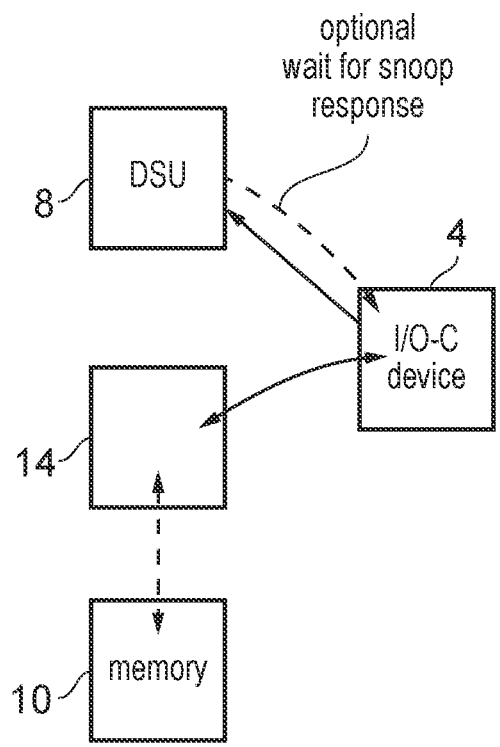

FIG. 3B provides another example use of the snoop-filter information. In the example of FIG. 3B, the first requestor 4 issues in parallel a request to the SLC 14 and snoop requests to the higher level caches 8. If the SLC 14 lookup misses, the situation is similar to that shown in FIG. 2A. If the SLC 14 lookup hits, and the snoop-filter information indicates that the first requestor 4 should wait for snoop responses before using the data in the matching entry (because more up-to-date data may be available) then the SLC 14 responds to the coherent access request with a message containing the data in the matching entry and indicating that the first requestor 4 should wait until the snoop responses have been received before using the data. In this case, the delay associated with waiting for the snoop responses is still observed. However, if the SLC 14 lookup hits, and the snoop-filter information indicates that the first requestor 4 can use the data stored in the matching entry without waiting for snoop responses, then the SLC 14 responds to the coherent access request with a message containing the data in the matching entry and indicating that the first requestor 4 can use the data without waiting for snoop responses. In this case, the delay is reduced and a performance is improved.

Figure 4:
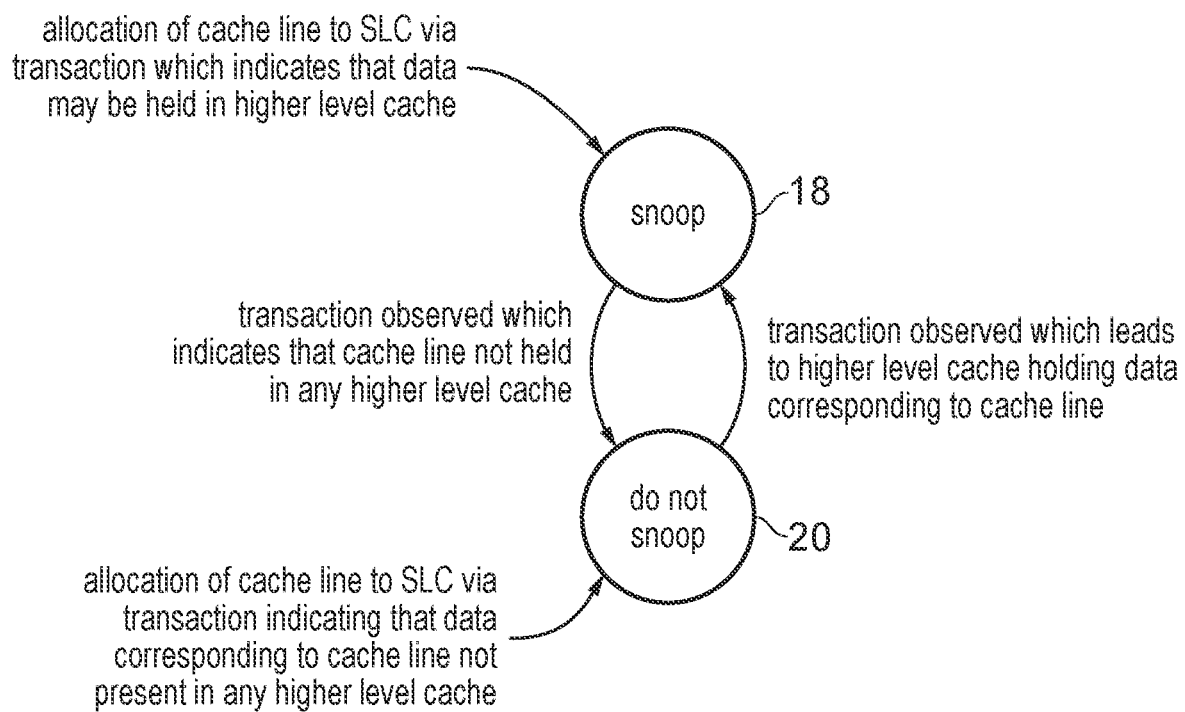
FIG. 4 is a state diagram illustrating example states of snoop-filter information.

FIG. 4 is a state diagram illustrating example states of the snoop-filter information. The snoop-filter information shown in FIG. 4 may be associated with a valid entry of the system-level cache 14.

If an entry was allocated into the SLC 14 via a transaction indicating that data corresponding to the cache line is not present in any higher level cache, then the snoop-filter information associated with that entry may be initially set to the state 20. This state indicates that the first requestor 4 can use the data stored in the matching entry without waiting for a response to a snoop of a coherent cache 8, because it is known that the data is not present in any higher level cache, and therefore snoops to higher level caches 8 will result in misses. Depending on the implementation, this state may indicate that snoops should not be issued, snoops may be issued but there is no need to wait for snoop responses, or that a response to a coherent access request should indicate that the data included in the response may be used without waiting for a snoop response. Transactions which might lead to this state being set as the initial state may include write back transactions (such as AMBA® WriteBack) which write a dirty cache line from a higher level cache into the SLC 14 and deallocate the line from the higher level cache, and transactions which write a clean cache line into a lower level cache and deallocate the line from the higher level cache (such as AMBA® WriteEvict). However, it will be appreciated that this list is non-exhaustive and any transaction indicating that data corresponding to the cache line is not present in any higher level cache can lead to the cache line being allocated in the state 20.

If an entry was allocated into the SLC 14 via a transaction indicating that data corresponding to the cache line may be present in any higher level cache, then the snoop-filter information associated with that entry may be initially set to the state 18. This includes transactions which guarantee that data corresponding to the cache line is present in a higher level cache, in addition to transactions which do not indicate either way whether or not data corresponding to the cache line is present in a higher level cache. The state 18 indicates that the first requestor 4 should not use the data stored in the matching entry without waiting for a response to a snoop of a coherent cache 8, because it is not known whether a newer copy of the data is present in a higher level cache. Hence, snoops should be issued and data stored in the SLC 14 should not be used until a snoop response is received.

The state of the snoop-filter information may transition from one state to another based on coherency transactions observed by the coherent interconnect 12. For example, observing any transaction indicating that higher level caches 8 no longer hold a copy of the data corresponding to the snoop-filter information may cause the state to be transitioned from the state 18 to the state 20. These transactions may include AMBA® WriteBack and AMBA® WriteEvict, in addition to snoop responses, corresponding to the same cache line as the SLC 14 entry, which indicate cache lookup misses in the higher level caches 8, for example. Transitioning the state from 18 to 20 in response to observing a snoop miss message means that the snoop-filter information may become more useful over time. For example, the snoop-filter information may initially start in the state 18, which may not be associated with a performance benefit, but over time observing snoop misses transitions entries to the state 20, associated with the improved performance of not waiting for snoop responses when an access request hits on one of these entries. On the other hand, observing any transaction which may lead to a higher level cache holding a copy of the cache line can cause the snoop-filter information to be transitioned from state 20 to state 18. These transactions may include read requests issued by a second requestor 6 having a coherent cache 8, for example.

Figure 5:
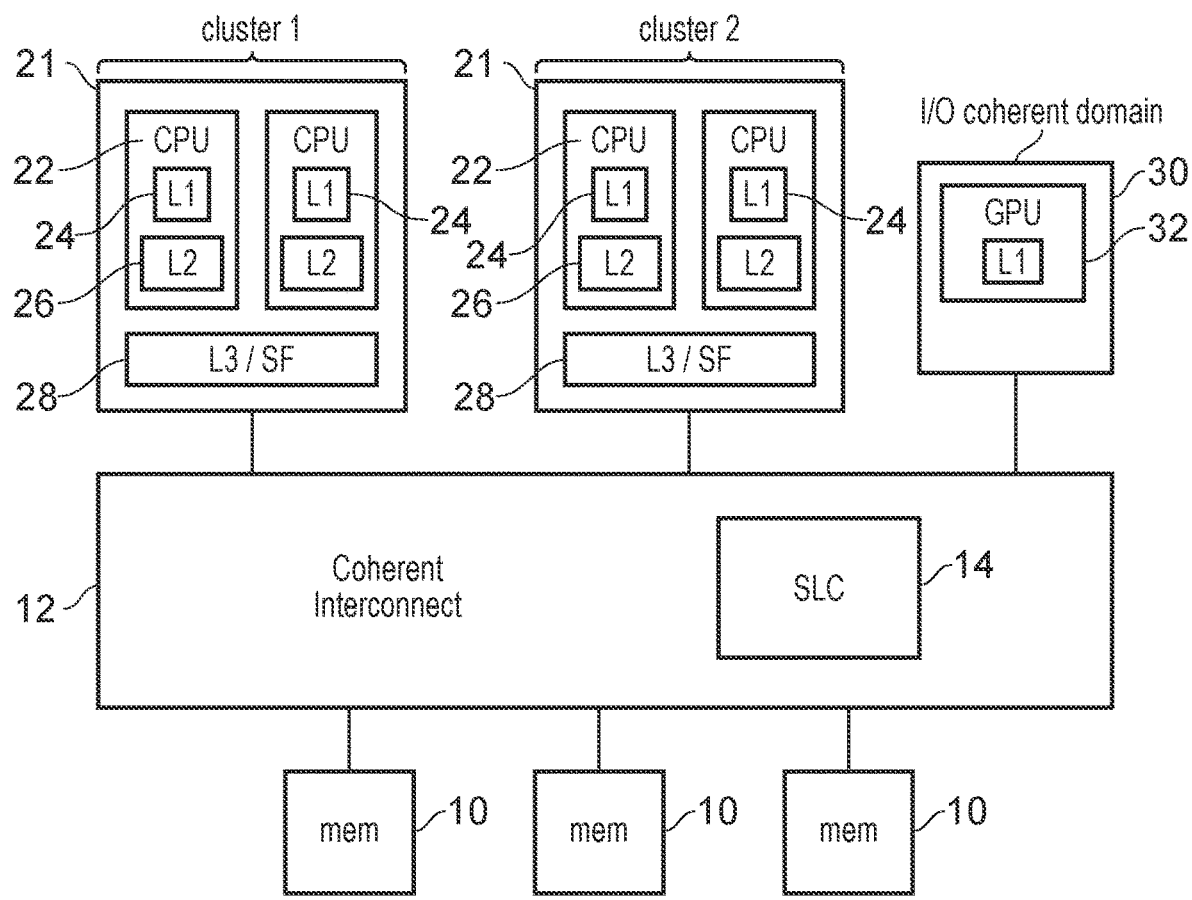
FIG. 5 illustrates an example of a data processing system.

FIG. 5 illustrates an example of a system according to the present technique. As in FIG. 1, the system comprises a coherent interconnect 12, SLC 14, and data stores 10. The system also includes two processing clusters 21 and an I/O coherent domain 30. Each processing cluster 21 comprises two or more central processing units (CPUs) 22 (in the example shown, each processor includes two CPUs 22), private caches associated with each CPU (L1 cache 24, L2 cache 26), and a shared cache 28. The shared cache 28 includes an inclusive snoop filter to filter coherency transactions issued between CPUs 22 in the processing cluster 21. The I/O coherent domain (or one-way coherent domain) includes devices which may issue coherent access requests, but are not themselves snooped by the coherent interconnect 12. For example, the I/O coherent domain may include a graphics processing unit (GPU) 32. The GPU may have its own private cache, but this private cache is not snooped by the coherent interconnect 12 (e.g. the private cache may not need snooping if it is not possible for the GPU to write dirty data to the cache—e.g. this may be the case if the cache is a translation lookaside buffer caching address translation information from page tables stored in the memory system). The I/O coherent domain is an example of a first requestor 4. The processing clusters are examples of either a first requestor or a second requestor 6, and the caches 24, 26, and 28 are examples of one or more coherent caches 8.

The SLC 14 is non-inclusive. If the SLC 14 were an inclusive cache, it would need to provide an entry for each line cached in the L1, L2, and L3 caches of each processing cluster. This would have a high hardware cost. If an inclusive snoop filter were provided associated with the SLC 14, this would also have to provide an entry for each line cached in the L1, L2, and L3 caches of the processing clusters, and would also be very expensive. Hence, without providing an exclusive snoop filter or cache, the SLC 14 is associated with snoop-filter information which indicates, for each entry in the SLC 14, whether or not the first requestor can use the data stored in the matching entry without waiting for a response to a snoop of a coherent cache 8.

The snoop-filter information associated with the SLC 14 may indicate whether the first requestor can use the data stored in the matching entry without waiting for a response to a snoop of all coherent caches 8. In this case, supposing that the GPU is the first requestor, either: snoop responses need to be received from both cluster 1 and cluster 2 before the data stored in the matching entry may be used, or no snoop responses need to be received.

However, in an alternative example the snoop-filter information associated with the SLC 14 may indicate whether the first requestor can use the data stored in the matching entry without waiting for a response to a snoop of a particular cache 8. In this case, separate snoop-filter information may be provided for each cache 8. Hence, either: snoop responses need to be received from all caches, a snoop response needs to be received from a selection of caches according to the snoop-filter information, or no snoop responses are needed before the first requestor can use the data stored in the matching entry.

Figure 6:
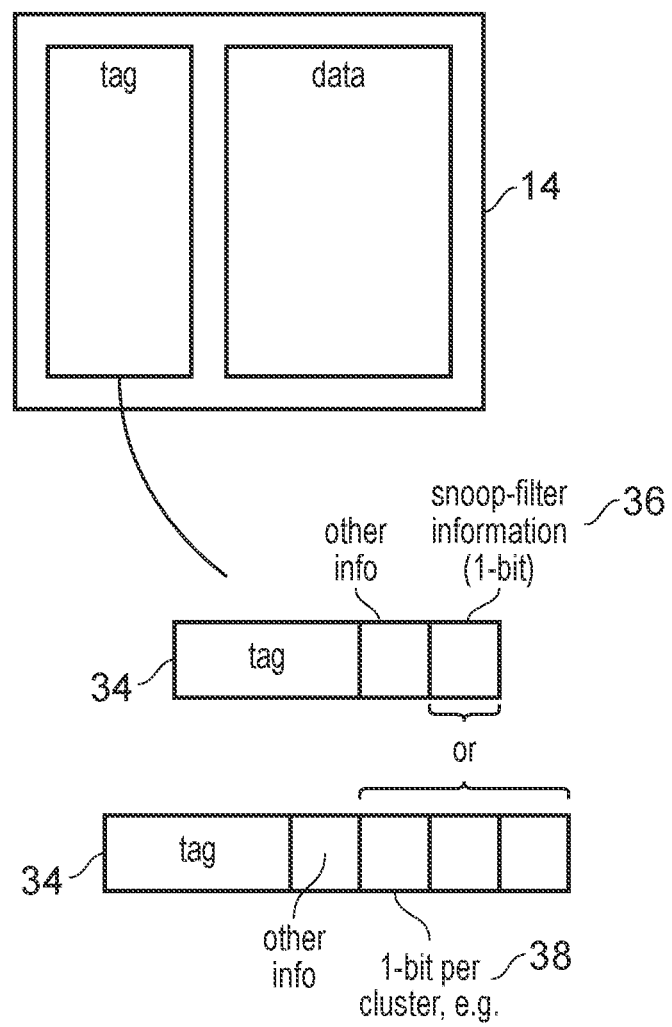
FIG. 6 illustrates an example non-inclusive cache.

FIG. 6 illustrates an example non-inclusive cache 14. In some examples, this may be a system-level cache 14. Data associated with a region in memory 10 is stored in the NI (non-inclusive) cache 14 in cache entries 34. Each cache entry is provided with a tag used to look up the cache in response to an access request. Whilst in some examples the tag and data corresponding to one cache entry are stored in the same physical entry in the cache, in other examples the tag and data are stored in separate entries in separate tag and data arrays. In the example of FIG. 6, the snoop-filter information associated with a given cache entry 34 is stored in a tag entry of the cache entry as a 1-bit flag, alongside the tag information and any other information (e.g. coherency state information or other metadata) that may be presented in a cache tag array entry. When a lookup is performed in the NI cache and the lookup hits on a cache entry, the snoop-filter information corresponding to that cache entry is provided in the cache entry without requiring any further lookup, because the tag is shared between the cached data and the corresponding snoop-filter information.

In the example of FIG. 6, the snoop-filter information requires as little as 1 bit of storage in the NI cache when stored as a snoop-filter flag 36. However, in some examples more than one item of snoop-filter information is associated with each cache line. For example, snoop-filter flags may be provided in a flag vector 38 providing snoop-filter information separately for different coherent caches 8 or groups of coherent caches 8 (such as those included in a processing cluster 21). It will be seen that cache lines that are not cached in the non-inclusive cache 14 are not associated with snoop-filter information. If a lookup performed in response to an access request for a cache line misses in the non-inclusive cache 14, then coherency control circuitry 16 does not have access to any snoop-filter information for that cache line. Snoop-filter information is only provided for cache lines that are cached in the non-inclusive cache 14.

The snoop filter provided by the non-inclusive cache 14 comprising the described snoop-filter information can be partially (or fully) powered down without needing to back-invalidate (nor flush) the caches that it covers, because it is not an inclusive snoop filter. For example, a system may place part of the non-inclusive cache 14 into a low-power state when load is low, e.g. to reduce leakage power. The corresponding snoop-filter information can also be powered down without requiring any back invalidations of the cache lines that it tracks. When the snoop filter provided by the non-inclusive cache 14 is later powered back up, the snoop-filter information of each entry can be reset to the "snoop" state 18 of FIG. 4 (pessimistic setting, as now it is no longer known whether the higher-level caches covered by the snoop filter hold the data of each entry). Alternatively, the snoop filter may assume that any invalid cache entry of the non-inclusive cache 14 has invalid snoop filter information (treated equivalent to snoop filter information in the "snoop" state 18, since on a miss in the cache no information is available on whether snoops can be suppressed), and when a new entry is allocated to the cache causing an invalid cache entry to transition to valid, the snoop filter information can be set according to the type of coherent transaction that caused the cache allocation.

Figure 7:
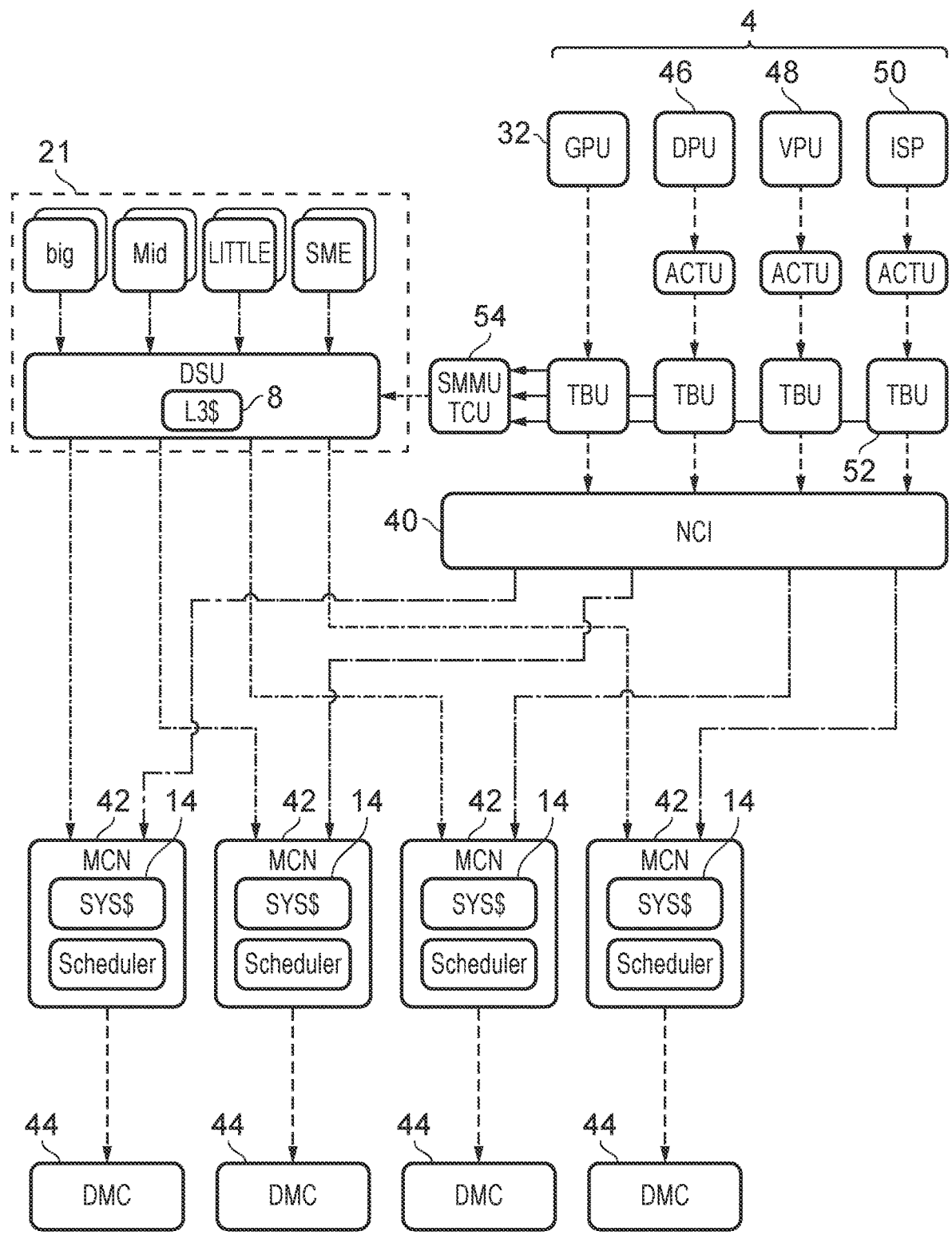
FIG. 7 illustrates a further example of a data processing system.

FIG. 7 illustrates a further example of a system according to the present technique. Non-inclusive system-level caches 14 are provided in memory control node (MCN) units 42, which connect to dynamic memory controller (DMC) units 44 for accessing memory 10. Logic such as coherency control circuitry 16 may be provided in the MCNs 42. A processing cluster 21 is connected to the MCNs and comprises a DSU (Arm® DynamIQ™ Shared Unit—a hardware unit which provides a level 3 cache as well as associated control logic for interfacing with lower levels of memory system hierarchy) and a number of CPUs, which may be heterogenous CPUs having different micro-architectures from each other (e.g. larger CPUs targeting higher performance and smaller CPUs targeting greater energy efficiency). The processing cluster contains a level 3 cache 8 in addition to any caches 8 provided within individual cores. The system also includes a number of I/O coherent devices 4, including a graphics processing unit (GPU) 32, a display processing unit (DPU) 46, a video processing unit (VPU) 48, and an image signal processing unit (ISP) 50. I/O coherent devices either have no cache or do not write dirty data to their cache, so that they may only need one-way coherency, requiring coherent response to accesses made to the rest of the system, but there is no need to snoop the I/O coherent devices in response to requests arising from the processor cluster 21 or other requestors. Access requests issued by the I/O coherent devices are passed to translation buffer units (TBUs) 52 for address translation before being passed via a system memory management unit translation control unit (SMMU TCU) 54 and a non-coherent interconnect (NCI) 40 (also known as an I/O coherent interconnect) to the MCNs. The I/O coherent access requests (or snoop requests) may also be routed directly to the processing cluster 21 via the SMMU TCU 54. FIG. 7 illustrates a system in which the present technique may be implemented, as it contains a number of I/O coherent devices and at least one non-inclusive cache 14 having a number of higher level caches 8. Snoop-filter information may allow access requests from the GPU 32 (for example) hitting in the system-level cache 14 to be serviced without waiting for snoop responses to be received from the coherent caches 8 associated with the processing cluster 21. In some cases, the cluster 21 may be placed in a low-power mode while the I/O coherent devices 4 are not. In these cases, a snoop to the processing cluster 21 is likely to be delayed further than usual. Hence, when the processing cluster enters a low-power mode, the snoop-filter information which enables the use of data without waiting for snoop responses may have a larger performance benefit. In the kind of system illustrated in FIG. 7, if the SLCs 14 use a read-no-allocate write-allocate allocation policy for allocation of data in response to requests originating from the cluster 21, then the SLC data originating from the CPUs of the cluster 21 will be data evicted from higher level coherent caches 8, and therefore data that does not need snoops to be issued to the higher level caches 8. Hence, with this sort of cache allocation policy, provision of snoop-filter information becomes particularly beneficial as it can avoid snoops for a large proportion of the addresses cached in the SLCs 14.

TABLE 1

Cache coherency behaviour for the system shown in FIG. 7.

| | Line present DSU/CPU caches? | Line present in SLC? | Snoop-filter information | What MCN should do? |
|---|---|---|---|---|
| 0 | No | No | No snoop filter information | Snoop to DSU |
| 1 | No | Yes | Wait for snoop responses | Snoop to DSU |
| 2 | No | Yes | Do not wait for snoop responses | Do not Snoop to DSU |
| 3 | Yes (could be Dirty) | No | No snoop filter information | Snoop to DSU |
| 4 | Yes (could be Dirty) | Yes | Wait for snoop responses | Snoop to DSU |

Table 1, shown above, provides a summary of the cache coherency behaviour of the system shown in FIG. 7. Each row corresponds to a different case when an access request for a location in memory 10 is issued by an I/O coherent device in the system (although would also apply if the request were issued by a non-I/O coherent device). The location in memory 10 corresponds to a cache line. It will be appreciated that this is merely an example, corresponding to an embodiment in which the snoop filter information is used to determine whether to snoop the coherent cache.

Row 0 describes the case in which the cache line is not cached in the processing cluster (be that in the DSU cache 8 or any higher level cache associated with the CPUs in the cluster) or in the system-level cache 14. In this case, there is no SLC 14 snoop-filter information associated with the requested cache line because, as shown in FIG. 6, the snoop-filter information is stored in SLC 14 entries (or in a related tag entry) and if there is no SLC 14 entry corresponding to the requested cache line then there is not any snoop-filter information stored for that entry. Hence, it is not known whether the processing cluster 21 holds a copy of the cache line (even though it does not actually hold a copy, this is not known by the MCN). Hence, servicing of a coherent request to the data from the I/O coherent device would be dependent on the outcome of snoops issued to the DSU, as it is not known that the caches of the cluster 21 do not need snooping. A memory access request may also be made to the DMC in parallel with the snoop requests. This is equivalent to the situation shown in FIG. 2A.

In row 1, the requested cache line is not cached in the processing cluster 21, but is cached in the SLC 14. The snoop-filter information is in a state indicating that the first requestor should wait for snoop responses before using the data cached in the SLC 14, because it is not yet known that the cache line is not cached in the processing cluster (i.e. state 18 in FIG. 4). Hence, as in FIG. 2B a snoop should be issued to the DSU and the I/O coherent device cannot use any returned data from memory until the snoop responses are received.

In row 2, the requested cache line is not cached in the processing cluster, but is cached in the SLC 14. The snoop-filter information is in a state indicating that the first requestor may use the data cached in the SLC 14 without waiting for snoop responses (i.e. state 20 in FIG. 4). Hence, the access request may be serviced quickly from the SLC 14 without waiting for snoop responses due to the presence of the snoop-filter information. Hence, row 2 illustrates the performance increase that may be provided by the present technique.

In row 3, the requested cache line is cached at the processing cluster 21 but not in the SLC 14. Because data is cached in the processing cluster 21, a snoop should be performed. In this case, because there is no SLC 14 entry there is no snoop-filter information and therefore the first requestor should wait for snoop responses before using any returned data.

In row 4, the requested cache line is cached at both the processing cluster 21 and the SLC 14. Because there is an SLC 14 entry there is snoop-filter information associated with the cache line. However, because the data is cached at the processing cluster, the snoop-filter information indicates that the first requestor should wait for snoop responses before using the data cached in the SLC 14 (i.e. state 18 in FIG. 4).

Figure 8:
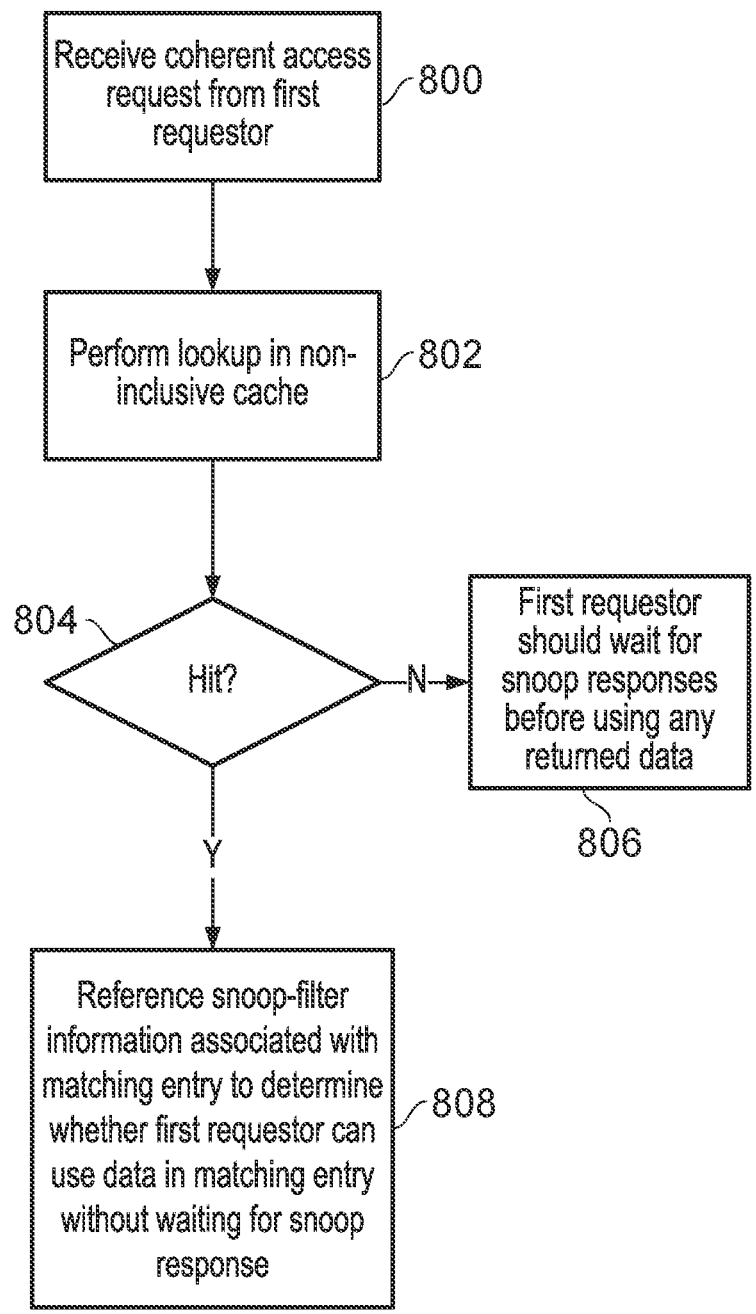
FIG. 8 is a flow diagram illustrating an example of responding to a coherent access request.

FIG. 8 is a flow diagram illustrating an example of the present technique. At step 800 a coherent access request is received from the first requestor. At step 802, a lookup is performed in the non-inclusive cache 14 to determine whether the non-inclusive cache 14 contains an entry corresponding to the memory location specified in the coherent access request. If, at step 804, it is determined that the cache lookup missed, and therefore that the non-inclusive cache 14 does not hold a copy of the requested data, then the process moves to step 806. At step 806, snoop requests are issued (if they have not already been issued by the first requestor) and a memory request is issued to retrieve data from the memory location specified in the coherent access request. Snoop-filter information is not provided due to the absence of an entry in the non-inclusive cache 14, and therefore it is not known whether or not a higher level cache contains a copy of the requested data. Hence, the first requestor should wait for all snoop responses to be received before using any returned data.

If, at step 804 it is determined that the cache lookup hit, then the process moves to step 808. At step 808, snoop-filter information associated with the matching entry is referenced to determine whether the first requestor can use the data stored in the matching entry without waiting for a snoop response. The coherent access request may be serviced based on this determination.

Figure 9:
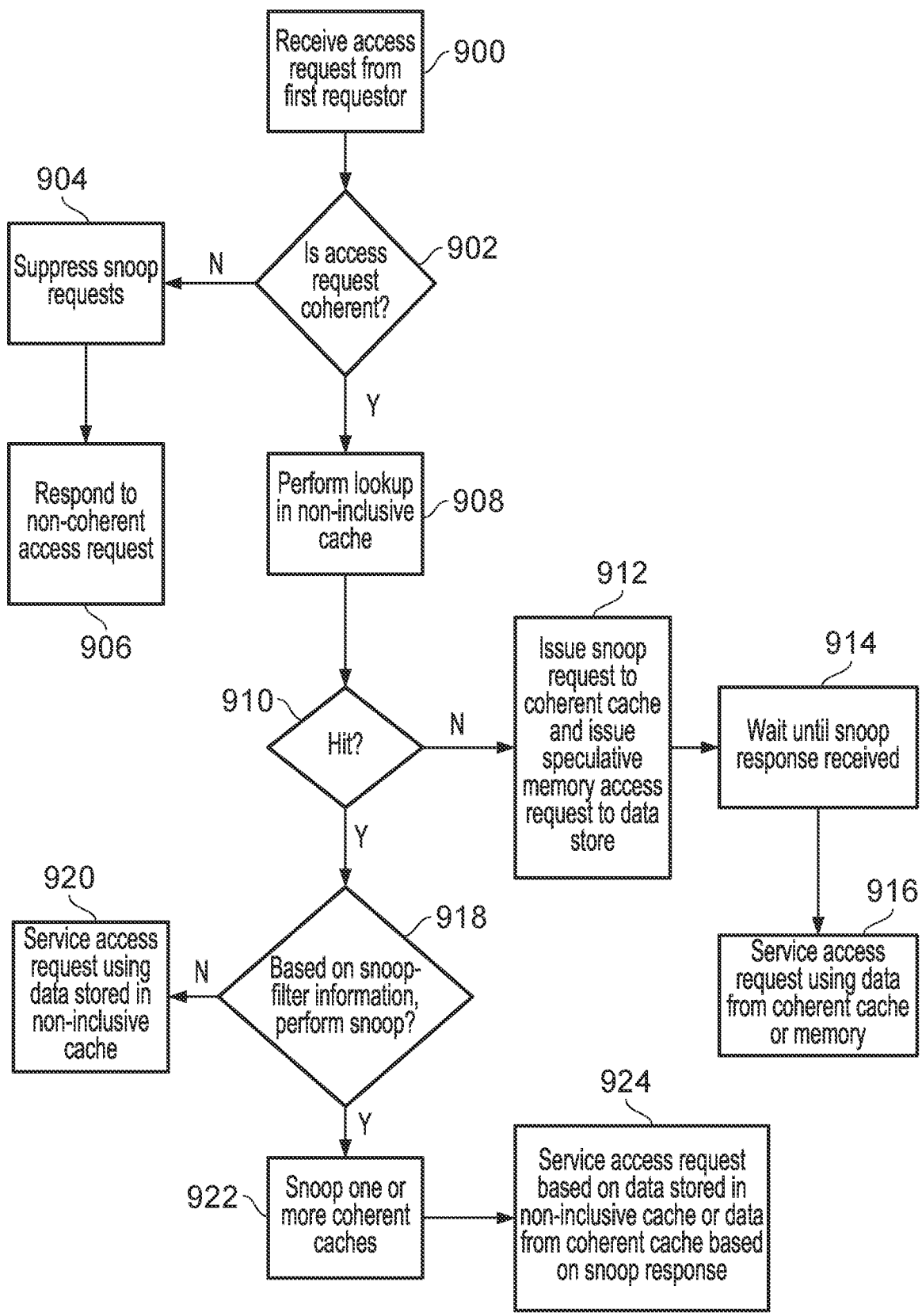
FIGS. 9 and 10 are flow diagrams illustrating further examples of responding to a coherent access request.
Figure 10:
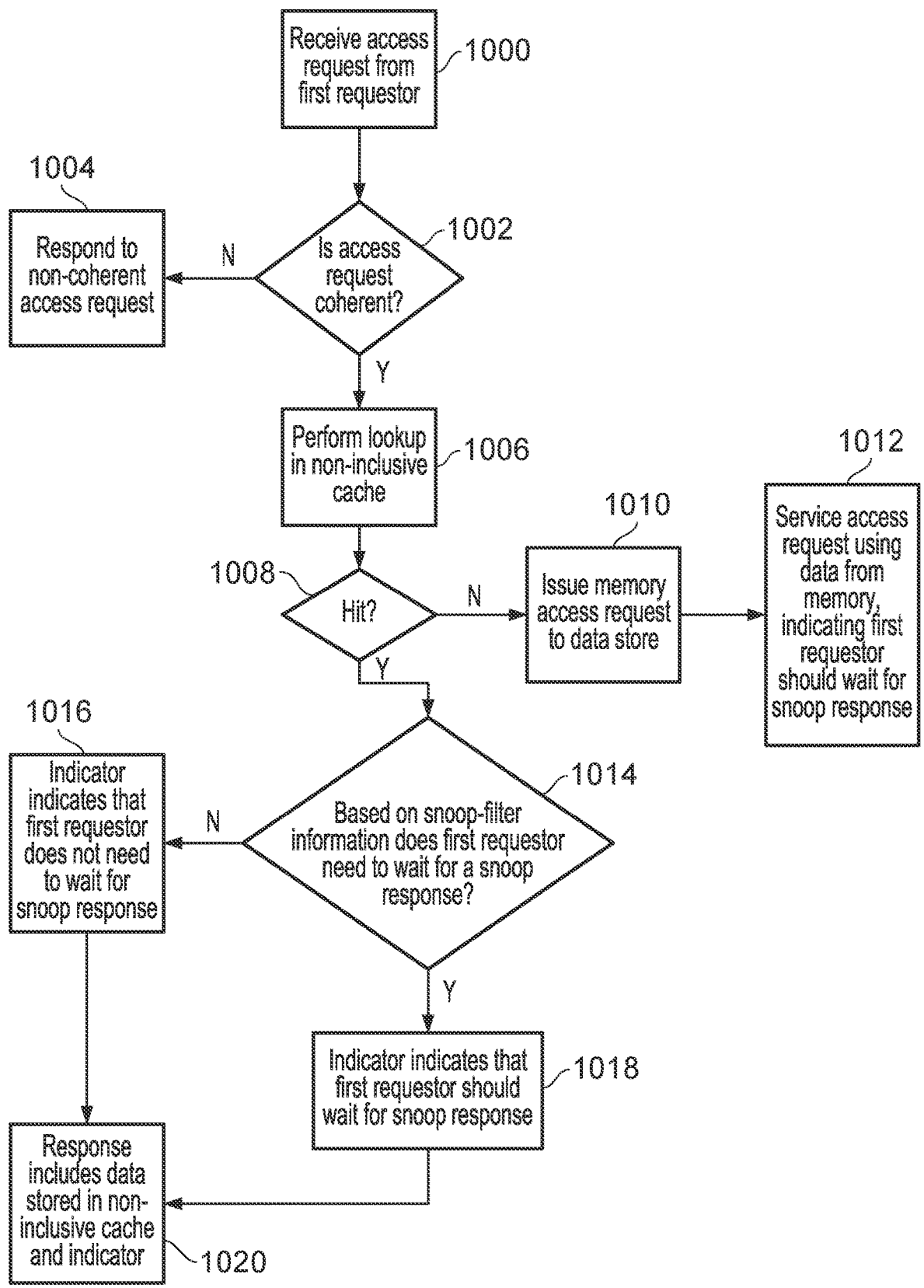

FIGS. 9 and 10 are further flow diagrams illustrating examples of the present technique.

FIG. 9 corresponds to an example in which snoop requests are issued by the coherency control circuitry 16 associated with the non-inclusive cache 14.

At step 900 of FIG. 9, an access request is received from a first requestor. At step 902 it is determined whether the access request is coherent. If the access request is not coherent, the coherency control circuitry 16 suppresses the issuing of snoop requests associated with the non-coherent access request at step 904. At step 906 a response is returned to the non-coherent access request as appropriate according to the particular system. This may include performing a memory access and/or a lookup in the non-inclusive cache 14.

If the access request is coherent, then at step 908 a lookup is performed in the non-inclusive cache 14 (as in step 802 of FIG. 8). At step 910 it is determined whether the lookup hit.

If the non-inclusive cache 14 lookup missed, then it is determined that it cannot be known whether higher level caches 8 contain a copy of the requested cache line. Hence, at step 912 snoop requests are issued to the coherent cache(s) 8. Optionally, a speculative memory access may also be performed to retrieve the requested data from memory 10 (alternatively, the memory access could be delayed until the snoop response is received). Regardless of the speed that the speculative memory access is returned (even if it is returned before the snoop responses), at step 914 the system waits until the snoops have been returned. At step 916 it is determined whether to service the coherent access request using data from a higher level cache (if the snoop responses indicated there was a copy of the data stored in a higher level cache) or to service the request using data from memory 10 (if the snoop responses indicate cache misses in the higher level caches 8). In one example, at step 914 the coherency control circuitry may discard the speculative data returned in response to the speculate memory access whilst waiting for snoop responses and issue further memory access requests for this data at a later time, for example when the snoop responses are received.

If the non-inclusive cache 14 lookup hit, then at step 918 the snoop-filter information associated with the matching entry is referenced to determine whether or not to snoop the coherent cache(s) 8. This is an example of determining whether the first requestor can use the data stored in the matching entry without waiting for a response to a snoop of a coherent cache. If the first requestor can use the data stored in the matching entry without waiting for a snoop response, then at step 920 snoop requests are not issued and the coherent access request is serviced using data stored in the matching entry of the non-inclusive cache 14.

If the first requestor cannot use the data stored in the matching entry without waiting for a snoop response, then at step 922 snoop requests are issued to the coherent cache(s) 8. Step 924 is then similar to step 916, except that if the snoop response indicates that there is no dirty copy of the data at the coherent cache, then the coherent access request is serviced based on the data from the matching entry of the non-inclusive cache 14, rather than from memory as at step 916.

FIG. 10 is a flow diagram corresponding to an example of steps taken by the non-inclusive cache 14 and associated coherency control circuitry 16, in an example in which snoop requests are issued directly by the first requestor.

At step 1000 an access request is received from a first requestor. At step 1002 it is determined whether the access request is coherent. If the access request is not coherent, the coherency control circuitry 16 responds to the non-coherent access request as appropriate (e.g. based on looking up the cache 14 and accessing memory if the cache lookup misses). In this case, no snoops are suppressed because the coherency control circuitry 16 is not in control of issuing snoops.

If the access request is coherent, then at step 1006 a lookup is performed in the non-inclusive cache 14 (as in step 802 of FIG. 8). At step 1008 it is determined whether the lookup hit.

If the non-inclusive cache 14 lookup missed, then it is determined that it cannot be known whether higher level caches 8 contain a copy of the requested cache line. Hence, at step 1010 a memory access request is issued to request data to be returned from the memory location specified by the coherent access request. Once the data has been returned from memory 10, at step 1012 the coherent access request is serviced using the data returned from memory 10 in a message indicating that the first requestor should wait for responses to any issued snoops before using the returned data.

If the non-inclusive cache 14 lookup hit, then at step 1014 the snoop-filter information associated with the matching entry is referenced to determine whether or not the first requestor needs to wait for a snoop response from the coherent cache 8 before using the data stored in the matching entry (the first requestor having itself having sent the snoop request that would trigger that snoop response).

If the snoop-filter information indicates that the first requestor is to wait for the snoop response before using the data stored in the matching entry, then at step 1018 an indicator is set to indicate that the first requestor should wait for snoops to be returned before using the data returned from the matching entry.

If the snoop-filter information indicates that the first requestor does not need to wait for a snoop response before using the data stored in the matching entry, then at step 1016 the indicator is set to indicate that the first requestor does not need to wait for snoops to be returned before using data returned from the matching entry.

In either case, at step 1020 a response is issued to the coherent access request containing the data stored in the matching entry of the non-inclusive cache 14 and the indicator set at one of steps 1016 and 1018.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
a non-inclusive cache configured to cache data; and
coherency control circuitry configured to:
look up the non-inclusive cache in response to a coherent access request from a first requestor,
in response to determining that the coherent access request can be serviced using data stored in a matching entry of the non-inclusive cache, reference snoop-filter information associated with the matching entry to determine whether the first requestor can use the data stored in the matching entry without waiting for a response to a snoop of a higher level coherent cache, further in a cache hierarchy from a memory than the non-inclusive cache, permitted to store a different version of the data stored in the matching entry of the non-inclusive cache,
track snoop-filter information only for addresses allocated a valid entry in the non-inclusive cache, and
in response to determining that the coherent access request cannot be serviced using data stored in the non-inclusive cache, issue a speculative memory access request to memory whilst it is unknown whether the coherent access request can be serviced by the coherent cache, and in response to return of returned data from the memory, either:
provide the returned data to the first requestor in a message indicating that the first requestor should wait for responses to any issued snoop requests before using the returned data, or
delay providing the returned data to the first requestor until receipt of a snoop response from the coherent cache indicating that the coherent cache cannot service the coherent access request.

2. The apparatus according to claim 1, in which
the snoop-filter information and the data associated with a given entry of the non-inclusive cache share a tag value used to determine whether a given access request hits against the given entry.

3. The apparatus according to claim 1, in which
the snoop-filter information associated with a given entry of the non-inclusive cache is stored as a snoop-filter flag indicating whether or not the first requestor can use the data stored in the matching entry without waiting for the response to the snoop of the coherent cache.

4. The apparatus according to claim 1, in which
the coherency control circuitry is configured to reference the snoop-filter information associated with the matching entry to determine whether to snoop the coherent cache in response to the request from the first requestor.

5. The apparatus according to claim 4, in which
in response to determining that the coherent access request misses in the non-inclusive cache, the coherency control circuitry is configured to issue a speculative memory access request to a data store before receiving a response to a snoop request issued to the coherent cache in response to the coherent access request.

6. The apparatus according to claim 5, in which
the coherency control circuitry is configured to delay responding to the coherent access request that misses in the non-inclusive cache until receipt of the snoop response.

7. The apparatus according to claim 1, in which
the coherency control circuitry is configured to return an indication to the first requestor indicating whether the first requestor can use the data stored in the matching entry without waiting for a snoop response from the coherent cache.

8. The apparatus according to claim 1, in which
the coherency control circuitry is configured to reference the snoop-filter information associated with the matching entry to separately determine whether the first requestor can use the data stored in the matching entry without waiting for a response to a snoop of each of two or more coherent caches.

9. The apparatus according to claim 8, in which
the snoop-filter information comprises a vector of flags, each flag corresponding to a respective cache group, each cache group comprising one or more coherent caches, and each flag indicating whether the first requestor can use the data stored in the matching entry without waiting for the response to the snoop of the corresponding cache group.

10. The apparatus according to claim 1, in which
in response to determining that the coherent access request misses in the non-inclusive cache, the coherency control circuitry is configured to return a miss indication to the first requestor indicating that the first requestor should wait for a snoop response from the coherent cache.

11. The apparatus according to claim 1, in which the non-inclusive cache has a read-no-allocate and write-allocate allocation policy for requests based on accesses to the coherent cache.

12. The apparatus according to claim 1, in which
in response to detecting an indication that the coherent cache does not hold a copy of data corresponding to a given entry, the coherency control circuitry is configured to set the snoop-filter information corresponding to the given entry to indicate that the first requestor can use the data stored in the given entry without waiting for the response to the snoop of the coherent cache.

13. The apparatus according to claim 1, further comprising:
the first requestor; and
the coherent cache.

14. The apparatus according to claim 13, in which
the coherent cache is associated with a cluster comprising two or more processors.

15. The apparatus according to claim 14, in which
the cluster comprises a cluster snoop filter.

16. The apparatus according to claim 15, in which
the cluster snoop filter is an inclusive snoop filter.

17. The apparatus according to claim 13, in which the first requestor comprises one of:
an I/O coherent device; and
a processing cluster.

18. A method comprising:
caching data in a non-inclusive cache;
looking up, with coherency control circuitry, the non-inclusive cache in response to a coherent access request from a first requestor;
in response to determining that the coherent access request can be serviced using data stored in a matching entry of the non-inclusive cache, referencing, with the coherency control circuitry, snoop-filter information associated with the matching entry to determine whether the first requestor can use the data stored in the matching entry without waiting for a response to a snoop of a higher level coherent cache, further in a cache hierarchy from a memory than the non-inclusive cache, permitted to store a different version of the data stored in the matching entry of the non-inclusive cache,
tracking, with the coherency control circuitry, snoop-filter information only for addresses allocated a valid entry in the non-inclusive cache; and
in response to determining that the coherent access request cannot be serviced using data stored in the non-inclusive cache, issuing a speculative memory access request to memory whilst it is unknown whether the coherent access request can be serviced by the coherent cache, and in response to return of returned data from the memory, either:
providing the returned data to the first requestor in a message indicating that the first requestor should wait for responses to any issued snoop requests before using the returned data, or
delaying providing the returned data to the first requestor until receipt of a snoop response from the coherent cache indicating that the coherent cache cannot service the coherent access request.

19. A non-transitory computer-readable medium storing computer-readable code for fabrication of an apparatus comprising:
a non-inclusive cache configured to cache data; and
coherency control circuitry configured to:
look up the non-inclusive cache in response to a coherent access request from a first requestor, and
in response to determining that the coherent access request can be serviced using data stored in a matching entry of the non-inclusive cache, reference snoop-filter information associated with the matching entry to determine whether the first requestor can use the data stored in the matching entry without waiting for a response to a snoop of a higher level coherent cache, further in a cache hierarchy from a memory than the non-inclusive cache, permitted to store a different version of the data stored in the matching entry of the non-inclusive cache,
track snoop-filter information only for addresses allocated a valid entry in the non-inclusive cache, and
in response to determining that the coherent access request cannot be serviced using data stored in the non-inclusive cache, issue a speculative memory access request to memory whilst it is unknown whether the coherent access request can be serviced by the coherent cache, and in response to return of returned data from the memory, either:
provide the returned data to the first requestor in a message indicating that the first requestor should wait for responses to any issued snoop requests before using the returned data, or
delay providing the returned data to the first requestor until receipt of a snoop response from the coherent cache indicating that the coherent cache cannot service the coherent access request.

* * * * *